(12) United States Patent
Le Dantec et al.

(10) Patent No.: US 6,301,307 B1
(45) Date of Patent: Oct. 9, 2001

(54) METHODS AND APPARATUSES FOR THE TRANSMISSION AND RECEIPT OF DIGITAL DATA MODULATED USING QUADRATURE AMPLITUDE MODULATION, AND COMMUNICATION DEVICES UTILIZING SUCH APPARATUSES AND METHODS

(75) Inventors: Claude Le Dantec, Saint Hilaire des Landes; Philippe Piret, Cesson Sevigne, both of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/994,437

(22) Filed: Dec. 19, 1997

(30) Foreign Application Priority Data

Dec. 23, 1996 (FR) .................................................. 96 15860

(51) Int. Cl.[7] .......................... H04L 23/02; H04L 27/36; H04L 27/04; H04L 27/22
(52) U.S. Cl. .......................... 375/261; 375/298; 375/324; 375/332; 332/103; 329/304
(58) Field of Search ..................................... 375/261, 298, 375/308, 320, 332, 329, 279, 280, 281, 322, 324; 329/304; 332/103

(56) References Cited

U.S. PATENT DOCUMENTS

| 3,311,879 | 3/1967 | Daher ................................... 714/779 |
| 4,483,012 | * 11/1984 | Wei ....................................... 375/298 |
| 4,493,082 | * 1/1985 | Cumberton et al. ................. 375/261 |
| 5,168,509 | * 12/1992 | Nakamura et al. .................. 375/261 |
| 5,210,775 | * 5/1993 | Takahara et al. .................... 375/308 |
| 5,226,043 | 7/1993 | Pughe, Jr. et al. .................... 714/768 |

FOREIGN PATENT DOCUMENTS 0 647 035    4/1995   (EP) .

OTHER PUBLICATIONS

Ken–ichi Konishi and Yoshiya Miyagaki, "Error–Rate Performance of Block–Coded M–ary Modulation and Hard Decision Decoding Systems on Rayleigh Fading Channel," Electronics and Communications in Japan, Part 1, vol. 74, No. 6, pp. 97–106 (Jun. 1991).

* cited by examiner

Primary Examiner—Stephen Chin
Assistant Examiner—Betsy L. Deppe
(74) Attorney, Agent, or Firm—Fitzpatrick, Cella, Harper & Scinto

(57) ABSTRACT

A device for transmitting digital data includes a selector which selects certain digital data couples which follow each other, a mapper, which, in accordance with a set of rules, maps each digital data couple selected to an amplitude couple, and a transmitter which transmits a signal in quadrature, the two components of such signal being modulated by the first and second amplitudes, respectively, of the amplitude couple. The set of mapping rules includes a rule that states that when the estimated probability that two amplitude couples will be confused, after the transmission has occurred, is greater than a certain value, then the digital data couples corresponding to the two amplitude couples have first or second digital data items whose value is the same.

50 Claims, 11 Drawing Sheets

METHODS AND APPARATUSES FOR THE TRANSMISSION AND RECEIPT OF DIGITAL DATA MODULATED USING QUADRATURE AMPLITUDE MODULATION, AND COMMUNICATION DEVICES UTILIZING SUCH APPARATUSES AND METHODS

BACKGROUND OF THE INVENTION

Field of the Invention

The present invention relates to a device and a method for coding digital data, a device and a method for receiving digital data and communication devices using them.

This invention is of use in all areas of coding, storage and transmission of digital data, and in particular those using an alphabet in which the number of symbols is different from 4, 16 or 256.

In particular, the present invention applies to transmission of radio data modulated by an amplitude modulation in accordance with two carriers in quadrature (hereinafter called "QAM") with 64 states (hereinafter called "64-QAM").

There are many coding methods allowing error correction of digital data. Among the best known codes used at present, the Reed-Solomon codes may be mentioned. These constitute a powerful means of correcting data transmission errors. They may be constructed on any alphabet containing a number of symbols which is equal to a power, $p^m$, of a prime number, p.

Very often a value of m equal to 8 and a value of p equal to 2 is chosen. The consequence of this large predominance of codes on alphabets with $2^8$ (=256) symbols is that the majority of Reed-Solomon coders and decoders which are found on the market work on this alphabet. Their low relative cost and their high efficiency means that they are used in many areas notably in the transmission or storage of digital data on tape or disc. This is because a Reed-Solomon coder or decoder constructed to work on $2^8$ symbols can also work on an alphabet containing $2^4$ (=16), $2^2$ (=4) or $2^1$ (=2) symbols. The corresponding codes are commonly known under the name "BCH codes" on respectively $GF(2^4)$, $GF(2^2)$ or $GF(2)$ (where GF means "Galois Field"). Nevertheless, an alphabet with 64 symbols cannot be treated in this way because the Galois field $GF(2^6)$ is not a sub-field of $GF(2^8)$.

Therefore, when the natural alphabet of an application contains 64 symbols, as in a system using a QAM-64 modulation, these symbols cannot be considered as words of a code on $GF(2^8)$.

Consequently, in the case of transmission of data modulated with a QAM-64 modulation, a person skilled in the art of transmission wishing to use inexpensive Reed-Solomon coding components uses them in a non-optimal way: he considers a sequence of binary data as a flow of octets which he codes with a Reed-Solomon coder. The code words produced are considered with no particular care as a sequence of 6-uples; each 6-uple is finally modulated in the form of a QAM-64 symbol.

On receipt, each symbol received is interpreted as a binary 6-uple. The resulting sequence of binary data is considered as a sequence of octets specifying one $GF(2^8)$ element. This sequence of $GF(2^8)$ elements, entering a Reed-Solomon decoder corresponding to the coder used at transmission, will be decoded in an ordinary manner. This manner of formatting QAM-64 symbols in octets has a significant drawback. As in any transmission system, transmission errors occur on QAM-64 symbols. However, the 6 bits of the same QAM-64 symbol may have been coded over two consecutive octets. As the Reed-Solomon decoder works on octets, it is possible that an error on a single QAM-64 symbol could produce an error on two consecutive octets, which amounts to doubling the error affecting the data transmitted in this manner. This reduces the correction capability of a Reed-Solomon coder expressed as a number of correctable QAM-64 symbols.

In order to resolve the problem disclosed above, a code specified on $GF(2^6)$ could be chosen. Two other problems then arise: on the one hand, in this case, a component of this type is not readily found today on general sale. On the other hand, if it is wished to use words of lengths greater than or equal to 64 binary 6-uples, no Reed-Solomon code of this length is known on $GF(2^6)$. Consequently, the redundancy of the codes is used less efficiently; for a given power of correction, a greater redundancy is required (in other words, the efficiency of the code is lower).

BRIEF SUMMARY OF THE INVENTION

The present invention intends to remedy these drawbacks. It aims, above all, to allow the transmission of coded symbols forming part of an alphabet having a number of symbols greater than the alphabet used for a transmission means, whilst limiting the efficiency losses of the code used to provide the coded symbols.

To this end, the invention relates, according to a first aspect, to a device for transmitting digital data, representing a physical quantity, characterised in that it has:

- a selection means adapted to select certain couples of digital data which follow each other,
- a mapping means adapted to map, according to a set of predetermined rules, each digital data couple selected to an amplitude couple, and
- a transmission means adapted to effect the transmission of a signal in quadrature, the two components of which are respectively modified by first and second amplitudes of the said amplitude couples, the said set of predetermined rules including at least the first rule according to which, when an estimated probability that two amplitude couples are confused after the said transmission is greater than a first predetermined value, then the digital data couples corresponding to the said two amplitude couples have first or second digital data items of the same value.

Correlatively, the invention relates, according to a second aspect, to a device for receiving couples of signal components in phase quadrature, characterised in that it has:

- a receiving means adapted to effect the reception of the said signals and to supply the said component couples, and
- a sorting means adapted to select certain so-called "sorted" component couples,
- a matching means adapted to match, according to a set of predetermined, so-called "matching" rules, each sorted component couple, with a so-called "received" digital data couple, the said set of predetermined matching rules including at least the first rule according to which, when an estimated probability that two signals having two component couples are confused after the said reception is greater than a first predetermined value, then the digital data couples received corresponding to the said two component couples have first or second digital data items of the same value.

Correlatively, the invention relates, according to a third aspect, to a method of transmitting digital data, representing a physical quantity, characterised in that it has:

a selection step during which certain digital data couples which follow each other are selected, a mapping step during which, according to a set of predetermined rules, each digital data couple selected is mapped to an amplitude couple, and a transmission step during which the transmission of a signal in quadrature is effected, the two components of which are respectively assigned first and second amplitudes of the said amplitude couples, the said set of predetermined rules including at least the first rule according to which, when an estimated probability that two amplitude couples are confused after the said transmission is greater than a first predetermined value, then the digital data couples corresponding to the said two amplitude couples have first and second numerical data items of the same value.

Correlatively, the invention relates, according to a fourth aspect, to a method of receiving couples of components of signals in phase quadrature, characterised in that it has:

a reception step during which reception of the said signals is effected and the said component couples are supplied, and a sorting step during which certain so-called "sorted" component couples are selected, a matching step during which, according to a set of so-called "matching" predetermined rules, each sorted component coupled is matched with a so-called "received" digital data couple, the said set of predetermined matching rules including at least the first rule according to which, when an estimated probability that two signals having two component couples are confused after the said reception is greater than a first predetermined value, then the digital data couples received corresponding to the said two component couples have first or second digital data items of the same value.

By virtue of these provisions, the most probable errors affecting the components of a signal transmitted by the transmission means affect only one of the digital data items of the digital data couple which corresponds to this signal.

Thus, even when these digital data have no redundant item able to permit the detection or correction of some of the errors affecting them, the invention makes it possible to reduce the consequences of these errors.

When these digital data include redundant items able to permit the correction of errors affecting the signal components, the invention makes it possible:

to reduce the number of redundant items necessary to correct a given number of errors, to increase the number of errors which can be corrected by using a given number of redundant items, and to increase the efficiency of transmission.

The invention applies in particular to the redundant items which, in pairs, make it possible to correct an error affecting a digital data item. This is because, in this case, for the most probable errors, each pair of redundant items makes it possible to correct at least one error affecting a signal (and more than one error, when the digital data corresponding to two signals relate only to a single digital data item on which errors can be corrected).

The present invention thus makes it possible to optimise, for a given coding efficiency, the power of correction and detection of errors of error correction codes (for example Reed-Solomon codes).

According to preferential characteristics of the four aspects of the invention, the said set of predetermined rules also includes the second rule according to which, for a predetermined proportion of pairs of amplitude couples whose estimated probability that the couples are confused after transmission is greater than a second predetermined value and less than the first predetermined value, then the digital data couples corresponding to the said two amplitude couples have first or second digital data items of the same value.

By virtue of these provisions, the most probable errors affecting the two components of the signal transmitted by the transmission means affect only one of the digital data items of the digital data couple which corresponds to this signal. The advantages of the invention, as disclosed above, are therefore reinforced by these preferential characteristics.

According to preferential characteristics of the transmission device according to the first aspect of the invention:

the selection means is adapted to use cyclic predetermined so-called "selection" rules, that is to say the said selection rules use a so-called "selection cycle" number, two digital data items separated by an integer number of selection cycles being selected in an identical manner by the selection means, and the mapping means is adapted to use cyclic predetermined so-called "mapping" rules, that is to say the said mapping rules use a so-called "mapping cycle" number, two equal couples separated by an integer number of mapping cycles being mapped to the same amplitude couple, the transmission device has a preselection means adapted to receive so-called "to be transmitted" symbols of an alphabet having a number Q of symbols and to supply to the selection means digital data which can take P different values, P being less than Q, the preselection means is adapted to receive symbols to be transmitted each able to be represented by a sequence of binary data and to supply, to the selection means, digital data each representing segments of the said sequences, and/or the transmission device has a coding means adapted to receive so-called "to be coded" symbols of the alphabet having a number Q of symbols and to supply to the preselection means so-called "redundant" symbols of the said alphabet having a number Q of symbols, able to permit the correction of errors affecting symbols to be coded, the symbols to be transmitted including the said redundant symbols.

Correlatively, according to preferential characteristics of the receiving device according to the second aspect of the invention, the sorting means is adapted to use cyclic predetermined so-called "sorting" rules, that is to say the said sorting rules use a so-called "sorting cycle" number, two digital data items separated by an integer number of sorting cycles being sorted in an identical manner by the sorting means, and the matching means is adapted to use cyclic matching rules, that is to say the said matching rules use a so-called "matching cycle" number, two equal couples separated by an integer number of matching cycles being matched to the same component couple, the receiving device has an identification means adapted to receive so-called "received" digital data belonging to an alphabet having P symbols, and to map digital data received to so-called "to be decoded" symbols belonging to an alphabet having Q symbols, with Q strictly greater than P, and/or the receiving device has a decoding means adapted to receive so-called "to be decoded" symbols of the alphabet having a number Q of symbols and to supply so-called "corrected" symbols to the said alphabet having a number Q of symbols, using correction rules and so-called "redundant" symbols to be decoded.

According to preferential characteristics of the transmission method according to the third aspect of the invention:

during the selection step, cyclic predetermined so-called "selection" rules are used, that is to say the said selection rules use a so-called "selection cycle" number, two digital data items separated by an integer number of selection cycles being selected in an identical manner during the selection step, and during the mapping step, cyclic predetermined so-called "mapping" rules are used, that is to say the said mapping rules use a so-called "mapping cycle" number, two equal couples separated by an integer number of mapping cycles being mapped to the same amplitude couple;

the transmission method includes a preselection step during which so-called "to be transmitted" symbols of an alphabet including a number Q of symbols are received and digital data are supplied which can take P different values, P being less than Q, the said digital data then being processed during the selection step;

during the preselection step, symbols to be transmitted are received which are each capable of being represented by a binary data sequence and digital data are supplied each representing segments of the said sequences, the said segments then being processed during the selection step; and/or the transmission method includes a coding step during which the so-called "to be coded" symbols of the alphabet including a number Q of symbols are received and so-called "redundant" symbols of the said alphabet having a number Q of symbols are supplied, capable of permitting the correction of errors affecting symbols to be coded, the symbols to be transmitted which are processed during the preselection step including the said redundant symbols.

Correlatively, according to preferential characteristics of the reception method according to the fourth aspect of the invention:

during the sorting step, predetermined cyclic so-called "sorting" rules are used, that is to say the said sorting rules use a so-called "sorting cycle" number, two digital data items separated by an integer number of sorting cycles being sorted in an identical manner during the sorting step, and during the matching step, cyclic matching rules are used, that is to say the said matching rules use a so-called "matching cycle" number, two equal couples separated by an integer number of matching cycles being matched to the same couple of components;

the receiving method includes an identification step during which received digital data are received belonging to an alphabet having P symbols, and digital data received are mapped to so-called "to be coded" symbols belong to an alphabet having Q symbols, with Q strictly greater than P; and/or the receiving method includes a decoding step during which so-called "to be decoded" symbols of the alphabet having a number Q of symbols are received and so-called "corrected" symbols of the said alphabet having a number Q of symbols are supplied, using correction rules and so-called By virtue of each of these arrangements, digital data which originate from symbols which cannot be represented by a single couple of components of a signal, can benefit from the advantages of the present invention, in particular the advantages which are disclosed above.

According to preferential characteristics of the first aspect of the invention, the transmission device as briefly disclosed above has a labelling means adapted to receive so-called "to be transmitted" digital data belonging to an alphabet having P symbols, and to map each digital data item to be transmitted to symbols to be coded, with Q strictly greater than P, P symbols of the second alphabet each representing exclusively one and only one symbol of the first alphabet.

Correlatively, according to preferential characteristics of the second aspect of the invention, the receiving device as briefly disclosed above has a translation means adapted to receive the corrected symbols and to supply so-called "transmitted" digital data belonging to an alphabet having P symbols.

Correlatively, according to preferential characteristics of the third aspect of the invention, the transmission method as briefly disclosed above includes a labelling step, during which so-called "to be transmitted" digital data belonging to an alphabet having P symbols are received, and each digital data item to be transmitted is mapped to symbols to be coded, with Q strictly greater than P, P symbols of the second alphabet each representing exclusively one and only one symbol of the first alphabet.

Correlatively, according to preferential characteristics of the fourth aspect of the invention, the receiving method as briefly disclosed above includes a translation step during which the corrected symbols are received and so-called "transmitted" digital data belonging to an alphabet having P symbols are supplied.

The present invention thus optimises, for a given coding efficiency, the capacity for error correction components of low cost (for example Reed-Solomon codes) to correct and detect errors, in particular working on GF(256), in the case of a transmission modulated with a QAM-64.

It should be noted that it is also possible to use code word lengths greater than sixty-three 6-uples.

By virtue of these arrangements, the coding means used, which works on the second alphabet, can be of lesser cost than a coding means working on the first alphabet.

In addition, for so-called "systematic" codes, in order to represent the digital data to be transmitted, which belong initially to the first alphabet (having P elements), it is possible to use symbols of the first alphabet. This makes it possible not to transmit, in order to represent them, symbols of the second alphabet. The invention thus optimises the number of elementary symbols which represent on the one hand the data to be transmitted and on the other hand the redundant symbols. The invention thus increases the efficiency of transmission.

The invention also relates to a network characterised in that it includes a transmission medium, at least one transmission device as briefly disclosed above and at least one receiving device as briefly disclosed above, the component couple transmitted by the transmission means of the transmission device being received, possibly affected by error, by the receiving means of the receiving device.

The advantages of each of this network are identical to those described above and will therefore not be repeated here.

BRIEF DESCRIPTION OF THE DRAWINGS

The characteristics, advantages and other objects of the invention will moreover emerge from the description of the accompanying drawings in which:

FIGS. 5A and 5B illustrate formats of data transmitted by implementing the present invention;

DETAILED DESCRIPTION OF THE INVENTION

In the embodiment described below, a Reed-Solomon coding is considered, working on octets, a coding which would supply, for five symbols to be coded, three redundant symbols. The proportion of the number of redundant symbols to the corresponding number of symbols to be coded (here 0.6) is higher than the proportions normally used (of the order of a few per cent), for explanatory purposes.

Figure 1:
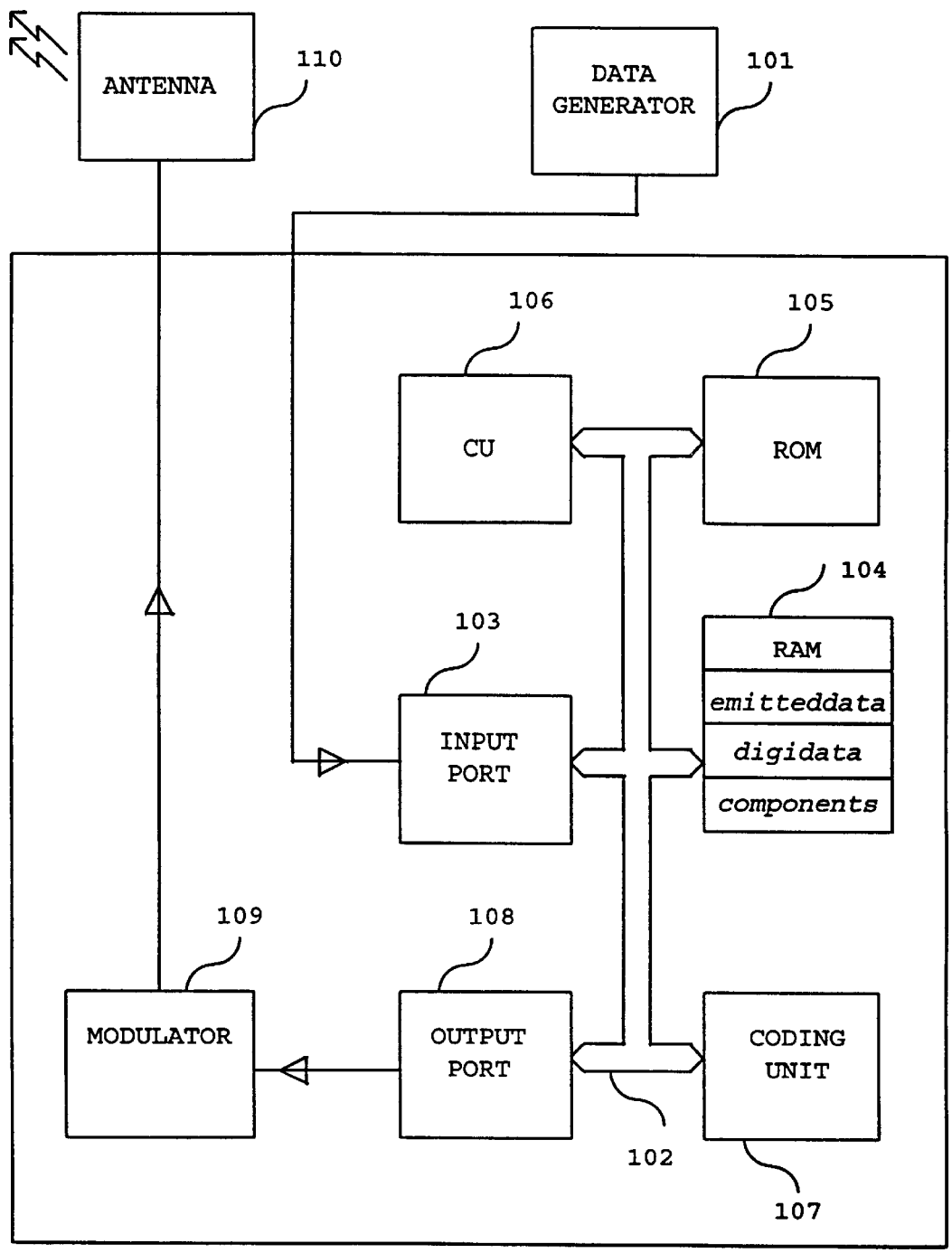
FIG. 1 illustrates an electronic block diagram of a transmission device according to the present invention.

FIG. 1 depicts a digital data generator 101 and, connected together by a bus 102:

- an input port 103;
- a random access memory 104;
- a read only memory 105;
- a processing unit 106;
- a coding unit 107;
- an output port 108;
- a modulator 109; and
- a transmission medium 110.

The digital data generator 101 supplies any symbols. It consists for example of a transmitted-data receiver, a data processing system and a data memory. The digital data which it supplies can come from sensors, for example in a facsimile machine, an electronic camera, microphones or readers of similar media, followed by analogue to digital converters, as well as systems for the storage, processing of synthesis of digital data. The data supplied by the digital generator 101 are referred to as "to be transmitted" and belong to an alphabet having P symbols. In the example described and depicted, P is equal to $2^6$, that is to say 64, the data to be transmitted being formed from sextuples of binary data supplied on six parallel electrical connections ending at the input port 103.

The input port 103 supplies, at a rate given by the processor unit 106, the data to be transmitted to the processor unit 106, according to procedures known to a person skilled in the art of microprocessor data processing systems.

The bus 102 has eight data lines plus one or more lines carrying protocol or parity signals.

The random access memory 104 stores the symbols, data, parameters and intermediate results necessary for the operation of the transmission device as described below.

The read-only memory 105 stores the operating system of the processing unit 106 and the program allowing the operation of the transmission device described below.

The processing unit 106 is a microcontroller having a microprocessor, interfaces and memories, of known type.

The coding unit 107 is a component using a Reed-Solomon coding well known to persons skilled in the art, working on octets supplied in parallel on the bus 102. It has its own memories and processing circuits (not shown). By way of example, the coding unit is based on the use of the component manufactured by AHA (Advanced Hardware Architectures, Inc., Pullman, Wash., USA) under the reference AHA4011, which uses:

- a Reed-Solomon code defined over the finite field $GF(2^8)$;
- a field defining primitive polynomial $P(x)=x^8+x^7+x^2+x+1$, and
- a generator polynomial, dependent on the variable R, given by $G(x)$ which is equal to the product, from $i=120$ to $i=119+R$, of the polynoms $(x-\alpha^i)$, where $R \in \{2, 3, 4, \ldots, 20\}$. (This polynomial is defined in international standards, Intelsat IESS 308 (Rev 6B), RTCA DO-217 Appendix F (Rev D) and the proposed CCITT SG-18)

For every two check bytes, the decoder can correct either two "erasures" or one "error". An "erasure" is an error with a known location. This could be determined with a parity detector or a signal dropout detector, for example. An erasure is indicated by the ERASE signal when the erase byte is clocked in the device. Errors are defined as erroneous bytes whose locations are unknown, i.e., there was no corresponding ERASE input for these bytes. Correcting "erasures" takes only half as much of the correction capability of the RS code as it takes to correct "errors", since the position information is already known for "erasures". The correction ability of the code is bounded as:

R ≧ number of "erasures" + twice the number of "errors".

Valid block length (N) is defined by the relationship: $R+1 \leq N \leq 255$, where R range from 2 to 20. A complete codeword can therefore range from a minimum of 3 bytes to a maximum of 255 bytes.

Other equivalent components are marketed by LSI LOGIC® or COMATLAS.

The output port 108 supplies, at a rate given by the processing unit 106, sextuples to the modulator 109, according to procedures known to persons skilled in the art of microprocessor data processing systems.

The modulator 109 is a modulator performing amplitude modulation in accordance with two carriers in quadrature with 64 states, a modulation known under the names QAM-64 and 64-QAM, which will be used indiscriminately below to designate it.

Figure 3:
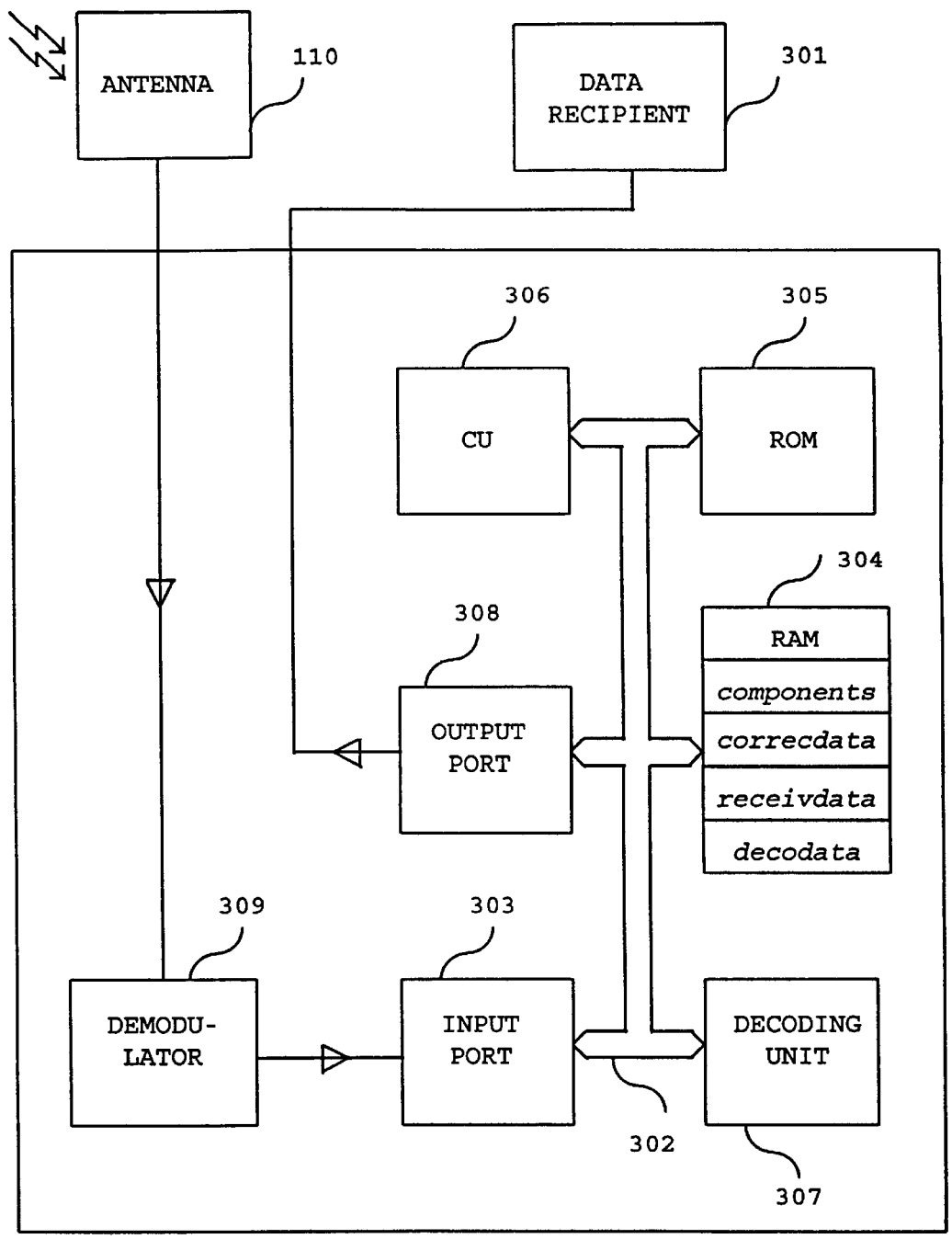
FIG. 3 illustrates a block diagram of a receiving device according to the present invention.

The transmission medium 110 is here composed of:

- a radio transmitter having a means for transposition to a certain transmission frequency of the signal leaving the modulator 109 and a transmission power control means,
- a transmitting antenna transmitting electromagnetic waves, the components of which represent amplitudes modifying the two carriers in quadrature which are modulated by the modulator 109,
- the transmission space in which the said electromagnetic waves move, and
- elements which are presented with reference to FIG. 3 and which concern the reception of waves which move in the transmission space.

It should be noted that each type of transmission medium carries noise capable of affecting with errors the symbols, data or information (here the component couples) resulting from demodulation of the signals which this medium carries.

The operation of each of the elements illustrated in FIG. 1 is detailed below.

FIG. 2 shows:

the digital data generator 101;

a labelling means 202, composed of the processing unit 106 and the memories 104 and 105, which is adapted to receive so-called "to be transmitted" digital data items belonging to an alphabet having P symbols (here 64), and to map each digital data item to be transmitted to symbols to be coded, with Q (here equal to 256) strictly greater than P, P symbols of the second alphabet each representing exclusively one and only one symbol of the first alphabet. In the embodiment described and depicted, the labelling means is adapted to add predetermined digital data (here binary zero values) to each symbol of the first alphabet in order to form a secondary digital data item belonging to the second alphabet which corresponds to the said symbol of the first alphabet;

a coding means 203, composed of the coding unit 107, which is adapted to receive so-called "to be coded" symbols of the alphabet having a number Q of symbols and to supply to the preselection means so-called "redundant" symbols of the said alphabet having a number Q of symbols, capable of allowing the correction of errors affecting symbols to be coded, the symbols to be transmitted having the said redundant symbols. In the embodiment described and shown, the coding means uses a Reed-Solomon coding;

a preselection means 204, composed of the processing unit 106 and the memories 104 and 105, which is adapted to receive so-called "to be transmitted" symbols of an alphabet having a number Q of symbols and to supply, to the selection means, digital data able to take P different values, P being less than Q. In the embodiment described and depicted, the preselection means is adapted to receive symbols to be transmitted each capable of being represented by a sequence of binary data and to supply, to the selection means, digital data items each representing segments of the said sequences;

a selection means 205, composed of the processing unit 106 and the memories 104 and 105, which is adapted to select certain digital data couples which follow one another in the series of digital data, using cyclic predetermined so-called "selection" rules, that is to say the selection rules use a so-called "selection cycle" number, two digital data items separated by an integer number of selection cycles being selected in an identical manner by the selection means;

a mapping means 206, composed of the processing unit 106 and the memories 104 and 105, which is adapted to map, according to a set of predetermined rules, each selected digital data couple to an amplitude couple. The said set of predetermined rules includes the first rule according to which, when an estimated probability that two amplitude couples are confused after the said transmission is greater than a first predetermined value, then the digital data couples corresponding to the said two amplitude couples have first or second digital data items of the same value and the second rule according to which, for a predetermined proportion of the pairs of amplitude couples for which the estimated probability that the couples are confused after transmission is greater than a second predetermined value and less than the first predetermined value, then the digital data couples corresponding to the said two amplitude couples have first or second digital data items of the same value (the said predetermined proportion corresponding to 74 of 98 pairs of amplitude couples considered). The mapping means is adapted to use cyclic predetermined so-called "mapping" rules, that is to say the said mapping rules use a so-called "mapping cycle" number, two equal couples separated by an integer number of mapping cycles being mapped to the same amplitude couple;

a transmission means 207, composed of the modulator 109, which is adapted to perform the transmission, on the transmission medium, of a signal in quadrature, with its components being respectively modified by the first and second amplitudes of the amplitude couples supplied by the mapping means. In the embodiment described and depicted, the transmission means is adapted to perform the transmission of a signal which is amplitude modulated in accordance with two carriers in quadrature with 64 states; and the transmission medium 110.

FIG. 3 shows a digital data recipient 301, and, interconnected by a bus 302:

an input port 303;

a random access memory 304;

a read-only memory 305;

a processing unit 306;

a decoding unit 307;

an output port 308;

a demodulator 309; and the transmission medium 110.

The digital data recipient 301 is, for example, composed of a transmitter of transmitted data, a data processing system, and a data memory. It may also have digital to analogue conversion means and means for displaying images, text or graphics, or for modulation of physical quantities and/or for processing and storage of data in analogue or digital form. The symbols supplied to the data recipient 301, by means of the output port 308, are known as "transmitted digital data" and belong to an alphabet having P symbols. They are generally identical to the data "to be transmitted" supplied by the digital data generator 101 of the transmission device (FIG. 1) and are therefore made up of sextuples of binary data supplied on six parallel electrical connections from the output port 308.

The input port 303 supplies, at a rate given by the processing unit 306, symbols known as "component couples", coming from the demodulator 309, to the processing unit 306, according to procedures known to persons skilled in the art of microprocessor data processing systems.

The bus 302 has eight data lines plus one or more lines carrying protocol or parity signals.

The random access memory 304 stores the symbols, data, parameters and intermediate results necessary for the operation of the transmission device as described below.

The read-only memory 305 stores the operating system of the processing unit 306 and the program allowing the operation of the transmission device described below.

The processing unit 306 is a microcontroller having a microprocessor, interfaces and memories, of known type.

The decoding unit 307 is a component using a Reed-Solomon decoding well known to persons skilled in the art, working on octets supplied in parallel on the bus 302. It has its own memories and processing circuits (not shown). By way of example, the decoding unit is based on the use of the component manufactured by AHA (Advanced Hardware Architectures, Inc., Pullman, Wash., USA) under the reference AHA4011.

The output port 308 supplies, at a rate given by the processing unit 306, sextuples to the data recipient 301, according to procedures known to persons skilled in the art of microprocessor data processing systems.

The demodulator 309 is a demodulator performing amplitude demodulation in accordance with two carriers in quadrature with 64 states.

The transmission medium 110 has the elements presented above with reference to FIG. 1, and:
- a receiving antenna (not shown) receiving the electromagnetic waves coming from the transmitting antenna, and
- a radio receiver having a means for transposition to a certain receiving frequency of the signal leaving the receiving antenna, a gain control means and means for synchronisation, notably of frame and phase.

The transmission medium 110 thus supplies a wave of standardised amplitude to the demodulator 309.

The operation of each of the elements illustrated in FIG. 3 is detailed below.

Figure 4:
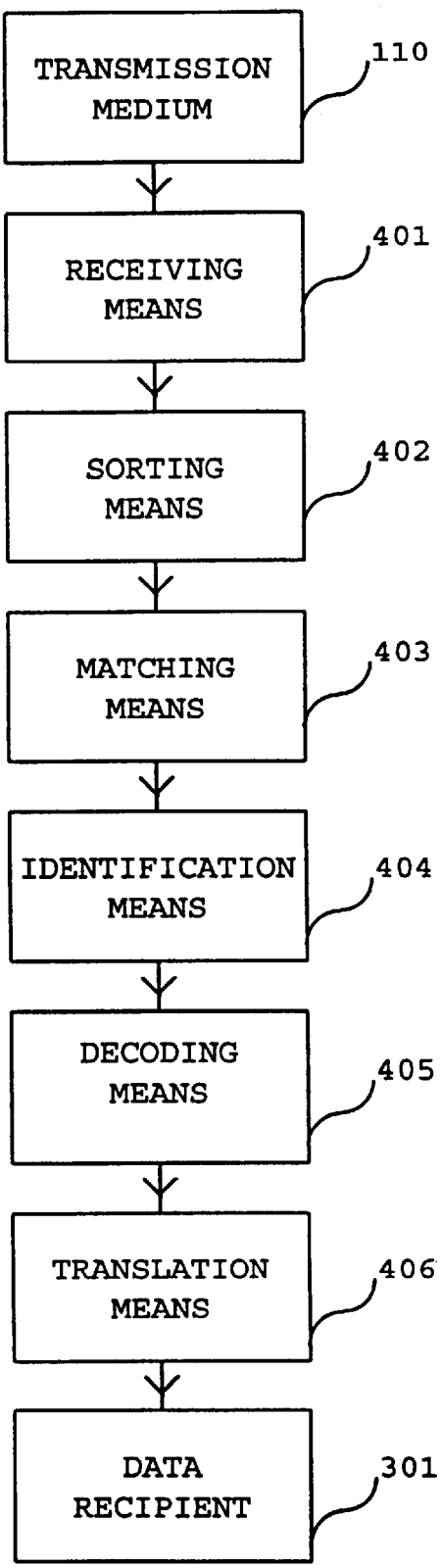
FIG. 4 illustrates a functional diagram of the receiving device illustrated in FIG. 3.

FIG. 4 shows:
the transmission medium 110.
a receiving means 401, composed of the demodulator 309, which is adapted to perform the reception of signals carried by the transmission medium and to supply component couples representing amplitudes in phase and in phase quadrature of the said signals. In the embodiment described and shown, the receiving means is adapted to receive a signal which is amplitude modulated in accordance with two carriers in quadrature with 64 states and to supply the component couple of the said signal to the sorting means;

a sorting means 402, composed of the processing unit 306, the read-only memory 305 and the random access memory 304, is adapted to select certain so-called "sorted" component couples using cyclic predetermined so-called "sorting" rules, that is to say the said sorting rules use a so-called "sorting cycle" number, two digital data items separated by an integer number of sorting cycles being sorted in an identical manner by the sorting means;

a matching means 403, composed of the processing unit 306, the read-only memory 305 and the random access memory 304, is adapted to match, according to a set of predetermined so-called "matching" rules, each sorted component couple, with a so-called "received" digital data couple. The said set of predetermined matching rules includes the first rule according to which, when an estimated probability that two signals having two component couples are confused after the said reception is greater than a first predetermined value, then the received digital data couples corresponding to the said two component couples have first or second digital data items of the same value and the second rule according to which, for a predetermined proportion of pairs of component couples for which the estimated probability that the couples are confused after transmission is greater than a second predetermined value and less than the first predetermined value, then the received digital data couples corresponding to the said two component couples have first or second digital data items of the same value. The matching means is adapted to use cyclic matching rules, that is to say the said matching rules use a so-called "matching cycle" number, two equal couples separated by an integer number of matching cycles being mapped to the same component couple;

an identification means 404, composed of the processing unit 306, the read-only memory 305 and the random access memory 304, is adapted to receive received digital data belonging to an alphabet having P symbols, and to map received digital data to so-called "to be decoded" symbols belonging to an alphabet having Q symbols, with Q strictly greater than P;

a decoding means 405, composed of the decoding unit 307, is adapted to receive so-called "to be decoded" symbols of the alphabet having a number Q of symbols and to supply so-called "corrected" symbols of the said alphabet having a number Q of symbols, using correction rules and so-called "redundant" symbols to be decoded. In the embodiment described and shown, the decoding means uses a Reed-Solomon decoding;

a translation means 406, composed of the processing unit 306, the read-only memory 305 and the random access memory 304, is adapted to receive the corrected symbols and to supply so-called "transmitted" digital data belonging to an alphabet having P symbols. In the embodiment described and shown, the translation means is adapted to receive corrected symbols each capable of being represented by a sequence of binary data and to supply transmitted digital data items each representing segments of the said sequences, by removing predetermined digital data from each corrected symbol in order to form a transmitted digital data item and the digital data recipient 301.

Figure 5A:
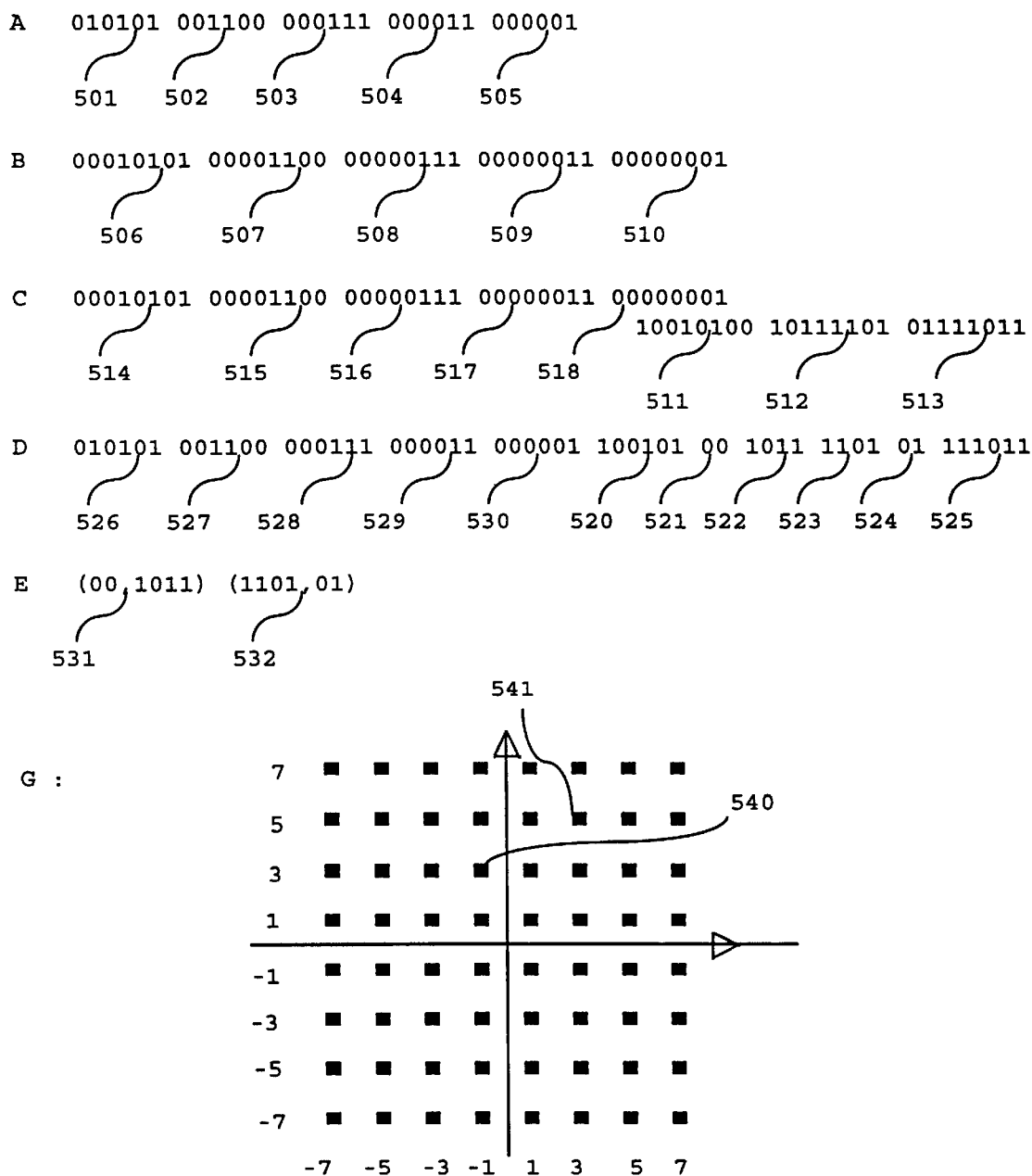

FIG. 5A shows successively the forms taken by a segment of a series of symbols transmitted from the digital data generator 101 to the transmission medium 110.

In line A, the data to be transmitted have the form of sextuples of binary data, referenced 501, 502, 503, 504 and 505. They are the digital data supplied by the digital data generator 101 to the input port 103.

In line B, the data to be transmitted are represented, after processing by the labelling means 202, by symbols to be coded, referenced 506, 507, 508, 509 and 510, which are octets in which the two most significant bits all have the same predetermined value, here equal to zero, and the six least significant bits are the six bits of the sextuples of the data to be transmitted.

In line C, the symbols to be coded correspond, after coding by the coding means 203, on the one hand, to redundant symbols referenced 511, 512 and 513, which are octets capable of allowing the correction of errors affecting the symbols to be coded and, on the other hand, to octets, referenced 514, 515, 516, 517 and 518, which are respectively equal to the symbols to be coded 506, 507, 508, 509 and 510.

The redundant symbols and the symbols to be coded are jointly known as "symbols to be transmitted". They are transmitted to the preselection means 204.

In line D, it can be seen that the preselection means has replaced:
- on the one hand, the three octets forming the redundant symbols 511, 512 and 513 by the digital data 520, 521, 522, 523, 524 and 525, composed respectively of:
  the six most significant bits of the first octet 511,
  the two least significant bits of the first octet 511,
  the four most significant bits of the second octet 512, the four least significant bits of the second octet 512, the two most significant bits of the third octet 513 and the six least significant bits of the third octet 513, and on the other hand, the octets, referenced 514, 515, 516, 517 and 518, by the sextuples 526, 527, 528, 529 and 530, which are respectively equal to the sextuples of data to be transmitted 501 to 505.

It can be seen in line E that the selection means supplies couples made up of successive digital data items which are not sextuples. The other digital data items are not selected by the selection means.

The selected digital data couples 531 and 532 are thus composed to form the couple 531, of the digital data 521 corresponding to the two least significant bits of the octet 511 representing the first redundant symbol and the digital data 522 corresponding to the four most significant bits of the octet 512 representing the second redundant symbol, to form the couple 532, of the digital data 523 corresponding to the four least significant bits of the octet 512 representing the second redundant symbol and the digital data 524 corresponding to the two most significant bits of the octet 513 representing the third redundant symbol.

In Table 1, below, mapping rules applied to the digital data couple 531 can be seen: the numbers of the lines and columns in Table 1 are equal to amplitudes. Each amplitude couple thus corresponds to a value in the table equal, to the base 4:

for the first digit, to the first digital data item of the couple 531, that is 00 in binary and 0 to the base 4, and for the last two digits, to the second digital data item of the couple 531, that is respectively 10 and 11 in binary and 2 and 3 to the base 4.

It should be noted that the couple 531, represented by the value 023 to the base 4, is associated with the amplitudes −1 and +3, respectively associated with the signal in phase and the signal in phase quadrature (amplitudes corresponding to the point 540 in the set of points shown in line G).

TABLE 1

| line | column | | | | | | | |
|---|---|---|---|---|---|---|---|---|
| | −7 | −5 | −3 | −1 | 1 | 3 | 5 | 7 |
| 7 | 000 | 010 | 030 | 020 | 120 | 130 | 110 | 100 |
| 5 | 001 | 011 | 031 | 021 | 121 | 131 | 111 | 101 |
| 3 | 003 | 013 | 033 | 023 | 123 | 133 | 113 | 103 |
| 1 | 002 | 012 | 032 | 022 | 122 | 132 | 112 | 102 |
| −1 | 202 | 212 | 232 | 222 | 322 | 332 | 312 | 302 |
| −3 | 203 | 213 | 233 | 223 | 323 | 333 | 313 | 303 |
| −5 | 201 | 211 | 231 | 221 | 321 | 331 | 311 | 301 |
| −7 | 200 | 210 | 230 | 220 | 320 | 330 | 310 | 300 |

It can be seen that, according to general characteristics of the present invention, the mapping means maps, according to a set of predetermined rules, each selected digital data couple to an amplitude couple, the said set of predetermined rules including at least the first rule according to which, when an estimated probability that two amplitude couples are confused after the said transmission is greater than a first predetermined value, then the digital data couples corresponding to the said two amplitude couples have first or second digital data items of the same value.

Furthermore, according to preferential characteristics of the present invention, the said set of predetermined rules includes the second rule according to which, for a predetermined proportion of the pairs of amplitude couples for which the estimated probability that the couples are confused after transmission is greater than a second predetermined value and less than the first predetermined value, then the digital data couples corresponding to the said two amplitude couples have first or second digital data items of the same value. In the embodiment described and shown, the predetermined proportion corresponds to 74 of 98 pairs of amplitude couples considered.

Finally it can be seen that:

the selection means uses cyclic predetermined selection rules, that is to say the said selection rules use a so-called "selection cycle" number, two digital data items separated by an integer number of selection cycles being selected in an identical manner by the selection means, and that the mapping means uses cyclic predetermined mapping rules, that is to say the said mapping rules use a so-called "mapping cycle" number, two equal couples separated by an integer number of mapping cycles being mapped to the same amplitude couple.

In Table 2, below, mapping rules applied to the digital data couple 532 can be seen: the numbers of the lines and columns in Table 1 are equal to amplitudes. Each amplitude couple thus corresponds to a value in the table equal, to the base 4:

for the first two digits, to the first digital data item of the couple 532, that is 11 and 01 in binary and 3 and 1 to the base four, and for the last digit, to the second digital data item of the couple 532, that is 01 in binary and 1 to the base four.

TABLE 2

| line | column | | | | | | | |
|---|---|---|---|---|---|---|---|---|
| | −7 | −5 | −3 | −1 | 1 | 3 | 5 | 7 |
| 7 | 000 | 100 | 300 | 200 | 201 | 301 | 101 | 001 |
| 5 | 010 | 110 | 310 | 210 | 211 | 311 | 111 | 011 |
| 3 | 030 | 130 | 330 | 230 | 231 | 331 | 131 | 031 |
| 1 | 020 | 120 | 320 | 220 | 221 | 321 | 121 | 021 |
| −1 | 022 | 122 | 322 | 222 | 223 | 323 | 123 | 023 |
| −3 | 032 | 132 | 332 | 232 | 233 | 333 | 133 | 033 |
| −5 | 012 | 112 | 312 | 212 | 213 | 313 | 113 | 013 |
| −7 | 002 | 102 | 302 | 202 | 203 | 303 | 103 | 003 |

It can be seen that the couple 532, represented by the value 311 to the base 4, is associated with the amplitudes +3 and +5 respectively associated with the signal in phase and the signal in phase quadrature (amplitudes corresponding to the point 541 of the set of points shown in line G).

Line G shows the amplitude couples mapped, by the mapping means 206, with, on the one hand, the sextuples 526 to 530 and, on the other hand, the selected couples, in the form, well known to persons skilled in the art, of a set of points, that is to say a representation in which each couple is represented by a point in a plane, the first term of the couple being used for the X-axis and the second term being used for the Y-axis. This set of points is a set of points for the QAM-64 modulation.

It should be noted here that, according to the most commonly used theoretical error probability estimation model, the probabilities of error, that is to say of confusion with another component couple, affecting a component couple, are estimated, by persons skilled in the art, as being a monotonic decreasing function of the Euclidean distance between the points representing these couples in the QAM-64 set of points. More precisely, this probability of error between two component couples is inversely proportional to the square of this Euclidean distance.

The result of this commonly accepted theoretical robability estimation is that there is:
- a first predetermined value, such that, when an estimated probability that two component couples are confused is greater than this first predetermined value, these two couples are immediately adjacent, that is to say they have either first or second identical components (they are adjacent on a line or a column of the set of points) and, respectively, either second, or first components which only differ from one another by an elementary unit (a unit corresponding to a difference in amplitude of two, in this case);
- a second predetermined value, such that, when an estimated probability that two component couples are confused is greater than this second predetermined value, if these two couples are not immediately adjacent, their first components differ by only one elementary unit and their second component differs by only one elementary unit.

For other transmission media and/or for other theoretical models, for which these probabilities of error between component couples could be different, the values are consequently chosen from the tables for mapping between amplitude couples and digital data.

FIG. 5B shows successively the forms taken by a segment of a series of symbols transmitted from the transmission medium 110 to the digital data recipient 301.

Line H shows the so-called "received" digital data couples supplied to the identification means 404 by the matching means 403. These digital data are referenced 550, 551, 552, 553, 554, 555, 556, 557 and 558.

For explanatory purposes, it has been assumed that the second couple 532 had, after transmission and reception, been affected by an error, that is to say that instead of corresponding to the amplitudes +3 and +5, it was considered to correspond to the amplitudes +3 and +3, these two amplitude couples being immediately adjacent in the QAM-64 set of points.

These amplitude couples are respectively linked, by Table 2, which is used, both in the transmission device and in the receiving device, for the second couple 532, to the values 311 and 331 which are immediately adjacent in Table 2 and which correspond to the component couples (110,101) and (111,101), in binary.

It should be noted here that only one of these two values corresponding, on the one hand, to the first four binary values and, on the other hand, to the last two binary values, has been modified, by virtue of the use of the predetermined mapping rules explained above (with reference to Table 1).

When the present invention is not used, some of the most probable errors correspond to a component couple modification such that simultaneously the said two values could have been modified.

Line I shows the values of the so-called "to be decoded" symbols supplied by the identification means 404 to the decoding means 405. These symbols to be decoded, 560, 561, 562, 563, 564, 565, 566 and 567, are octets. They are made up respectively:
- for the first five octets, of the six binary values of each received digital data couple, taken in the order of their appearance in the digital data of this couple, binary values to which two binary value "0"s are added to form the two most significant binary values,
- for the octet 565, of the six binary values of the couple 555, taken in the order of their appearance in the digital data of this couple 555, to form the six most significant binary values of the octet 565, and the first two binary values of the first digital data item of the couple 556, to form the two least significant binary values of the octet 565,
- for the octet 566, of the last four binary values of the couple 556, taken in the order of their appearance in the digital data of this couple 556, to form the four most significant binary values of the octet 566, and the first four binary values of the digital data of the couple 557, to form the four least significant binary values of the octet 566, and
- for the octet 567, of the last two binary values of the couple 557, taken in the order of their appearance in the digital data of this couple 557, to form the two most significant binary values of the octet 567, and the six binary values of the digital data of the couple 558, to form the six least significant binary values of the octet 567.

Line J shows the corrected symbols supplied by the decoding means 405 to the translation means 406, referenced 570, 571, 572, 573 and 574. In order to perform the processing for decoding, that is to say in this case for error correction, the decoding means 405 uses the last three symbols to be decoded as redundant symbols capable of allowing the correction of errors affecting the first five symbols to be decoded. The decoding means here uses a Reed-Solomon decoding.

Line K shows the transmitted digital data, referenced 580, 581, 582, 583 and 584, supplied by the translation means 406 to the digital data recipient 301, and respectively equal to the six least significant binary values of the corresponding octets in line J.

Figure 2:
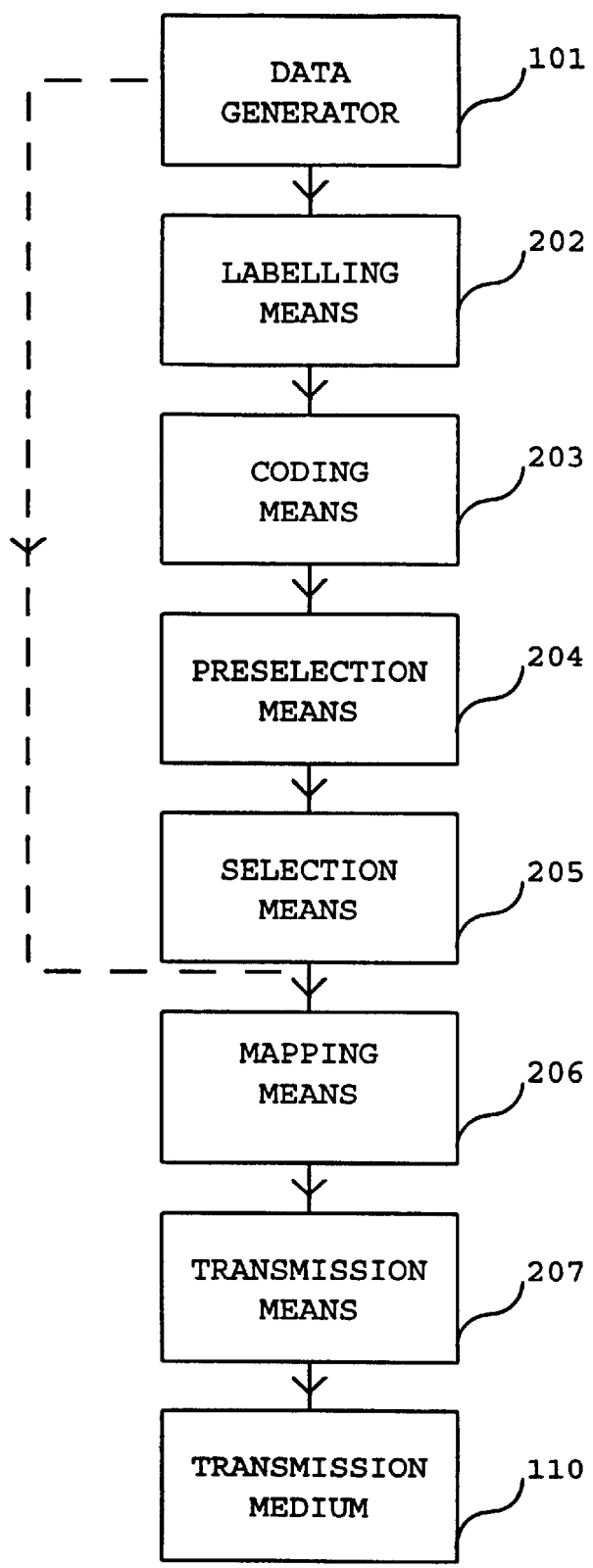
FIG. 2 illustrates a functional diagram of the transmission device illustrated in FIG. 1.
Figure 6:
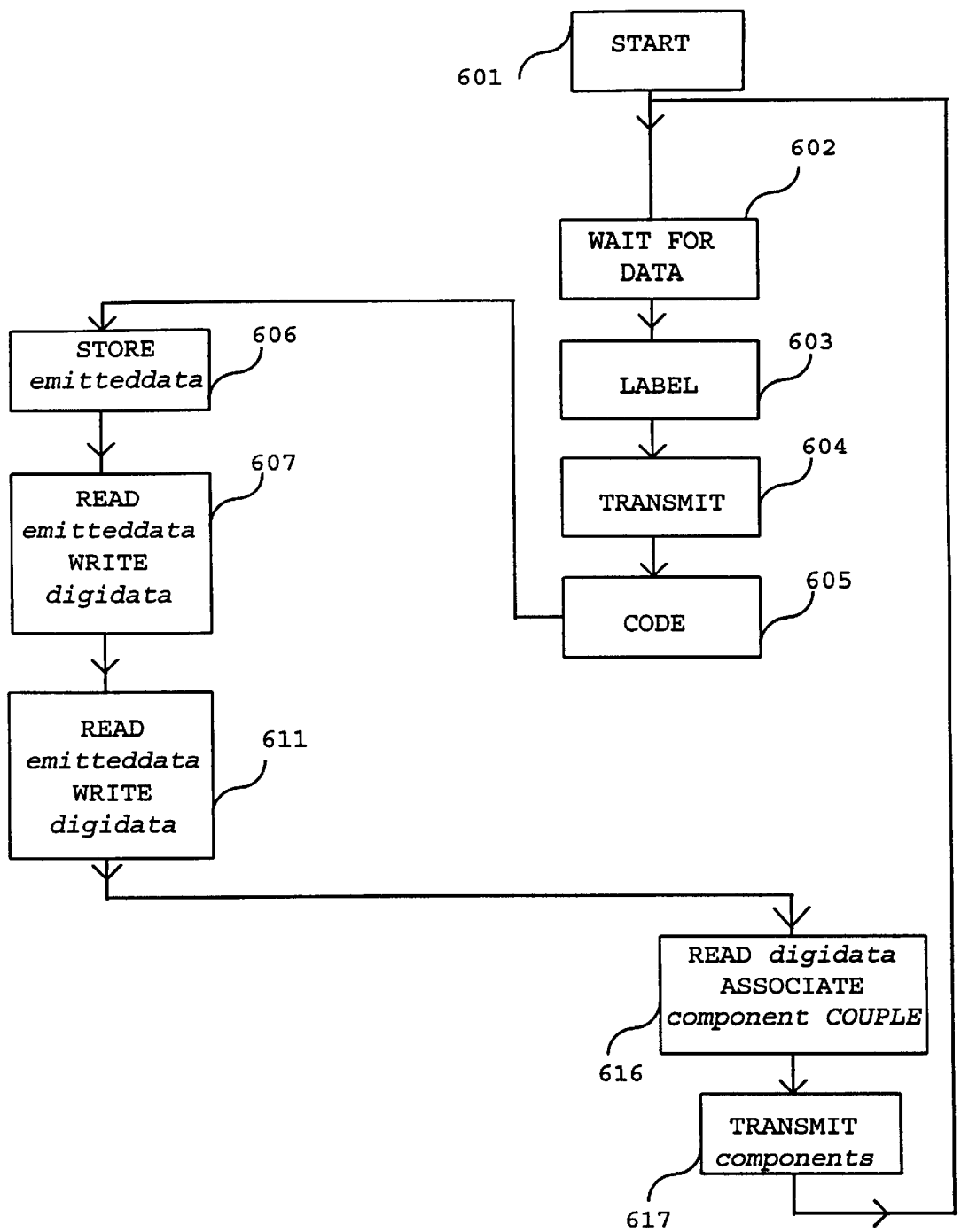
FIG. 6 depicts an operational flow diagram of the transmission device illustrated in FIGS. 1 and 2.

FIG. 6 shows an operational flow diagram of the transmission device illustrated in FIGS. 1 and 2. After the start 601 of the transmission device, the operation 602 consists of waiting until five data items to be transmitted are supplied by the data generator 101.

Next, the processing unit 106 carries out the operation 603, which consists, for the labelling means, of labelling the data to be transmitted as explained above (FIG. 5).

Next, the operation 604 consists of transmitting the symbols to be coded coming from the labelling means to the coding unit 107. The operation 605 consists of the coding of the symbols to be coded, by the coding unit 107, which then supplies redundant symbols.

The operation 606 consists of storing, by the preselection means 204, symbols to be transmitted, composed of symbols to be coded and redundant symbols, in a register "emitteddata" of the random access memory 104. The register "emitteddata" is of a type known to persons skilled in the art under the name FIFO ("First In, First Out"), that is to say in this register:
- each write causes the movement of a pointer for writing into the said register,
- the reads are made in the same order as the writes, and
- each read causes the movement of a pointer for reading from the said register.

The operation 607 consists of reading, from the register "emitteddata", five symbols to be transmitted and of storing the six least significant bits of each symbol to be transmitted in one position of a register "digidata" of the random access memory 104, this register also being of FIFO type.

It should be noted here that the five symbols to be transmitted considered in the operation 607 are, in fact, the five symbols to be coded coming from the coding means 203.

The operation 611 consists of reading, from the register "emitteddata", three symbols to be transmitted and of storing successively in the register "digidata"

a digital data item composed of the six most significant bits of the first symbol to be transmitted, a digital data item composed of the two least significant bits of the first symbol to be transmitted, and the four most significant bits of the second symbol to be transmitted, a digital data item composed of the four least significant bits of the second symbol to be transmitted, and the two most significant bits of the third symbol to be transmitted, a digital data item composed of the six least significant bits of the third symbol to be transmitted.

It should be noted here that the three symbols to be transmitted considered in the operation 611 are, in fact, the three redundant symbols generated by the coding means 203.

The operation 616 consists of:

reading, from the register "digidata1", six digital data items, respectively mapping to them components of an amplitude couple, with mapping rules which are immaterial, and storing the six amplitude couples in a register "components" of the random access memory 104, this register also being of FIFO type, reading, from the register "digidata", a digital data item, associating with it, using Table 1, an amplitude couple and storing this amplitude couple in the register "components", reading, from the register "digidata", a digital data item, associating with it, using Table 2, an amplitude couple and storing this amplitude couple in the register "components" and reading, from the register "digidata", a digital data item, mapping to it, with mapping rules which are immaterial, components of an amplitude couple, and storing the amplitude couple in the register "components".

For reasons of simplicity, the mapping rules are alternately composed of the mapping rules illustrated by Table 1 and the mapping rules illustrated by Table 2. The mapping rules are thus cyclic.

Finally, the operation 617 consists of:

reading, in pairs, the values, which in fact form component couples, from the register "components" and performing, using the modulator 109, the modulation of a signal in QAM-64 having the said component couples.

Following the operation 617, the operation 602 is repeated.

Figure 7:
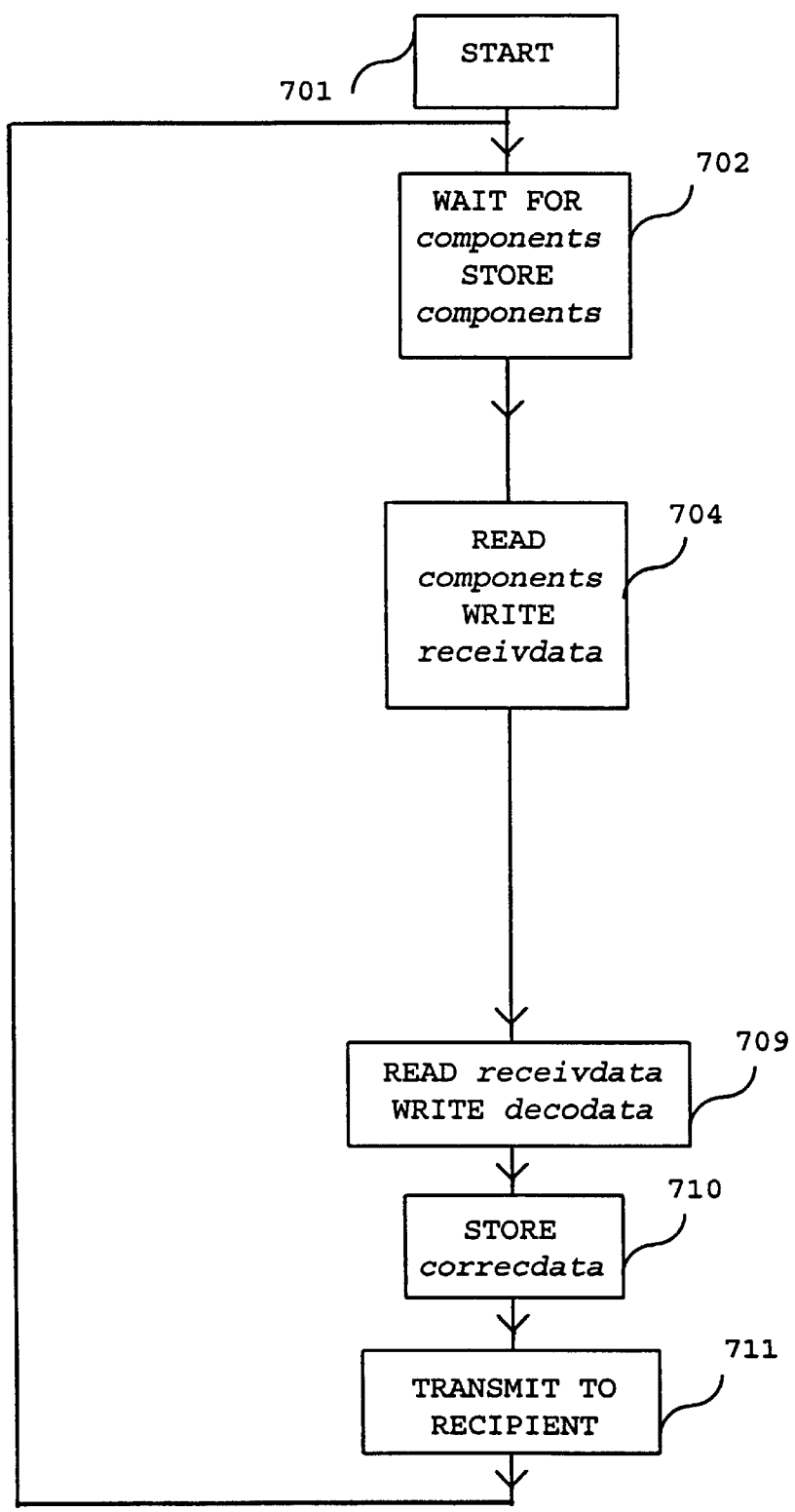
FIG. 7 depicts an operational flow diagram of the receiving device illustrated in FIGS. 3 and 4.

FIG. 7 shows an operational flow diagram of the receiving device presented with reference to FIGS. 3 to 5.

After the start 701, the operation 702 consists of waiting for nine component couples supplied by the demodulator 309 and of storing the eighteen components received in this way in a register "components" of the random access memory 304, this register operating as a FIFO.

The operation 704 next consists of:

reading six successive component couples from the register "components", associating a sextuple with each couple with mapping rules the inverse of the rules respectively used during the operation 616, for the first six digital data items, and storing the said sextuples in a register "receivdata" of the random access memory 304, the said register itself also operating as a FIFO, reading a new component couple from the register "components" and writing into the register "receivdata" the sextuple formed from the digital values which correspond, by means of Table 1, to the said received component couple, reading another component couple from the register "components", and writing into the register "receivdata1" the sextuple formed from the digital values which correspond, by means of Table 2, to the said received component couple, and reading a last component couple from the register "components", associating with it a sextuple with mapping rules the inverse of the rules respectively used during the operation 616, for the last digital data item, and storing the said sextuple in the register "receivdata1".

The operation 709 consists of:

reading five sextuples from the register "receivdata", adding two zero most significant bits to each sextuple read in order to form octets, and writing the result into a register "decodata", and reading four sextuples from the register "receivdata" to form:

a first octet taking as most significant bits the six bits of the first sextuple and, as least significant bits, the two most significant bits of the second sextuple, a second octet taking as most significant bits the four remaining bits of the second sextuple and, as least significant bits, the four most significant bits of the third sextuple, and a third octet taking as most significant bits the two remaining bits of the third sextuple and, as least significant bits, the six bits of the third sextuple.

It should be noted here that the octets composed in this way correspond to the symbols to be decoded 560 to 567, described with reference to line I of FIG. 5B.

The operation 710 consists of transmitting to the decoding unit 307 the values stored in the register "decodata", receiving from the decoding unit 307 corrected symbols, and storing them in a register "correcdata" of the random access memory 304.

Finally, the operation 711 consists of reading each corrected symbol, removing the two most significant binary values from it, and supplying the resulting sextuple to the digital data recipient 301. Next, the operation 702 is repeated.

According to a number of variants of the present invention, it is arranged that each redundant octet is transmitted over two QAM-64 symbols independent of the other symbols: for example a redundant octet may be divided into 2+6 bits or into 2 times 4 bits. In this first variant, if a QAM-64 symbol contains only 0<n<6 redundant bits, there are a number of possibilities:

the remaining (6-n) bits are used to insert an error detecting or correcting code or any other useful information (label, protocol information, encryption, etc)

it is arranged that the spacing properties for the symbols connected with redundancy are improved by using only a sub-set of points of the initial QAM-64 set of points: for example, a good configuration consists of coding the redundant octets into two times 4 bits and using a QAM-16 modulation, a sub-set of points of the initial set of points. An example of a set of points is illustrated in FIG. 8.

Figure 8:
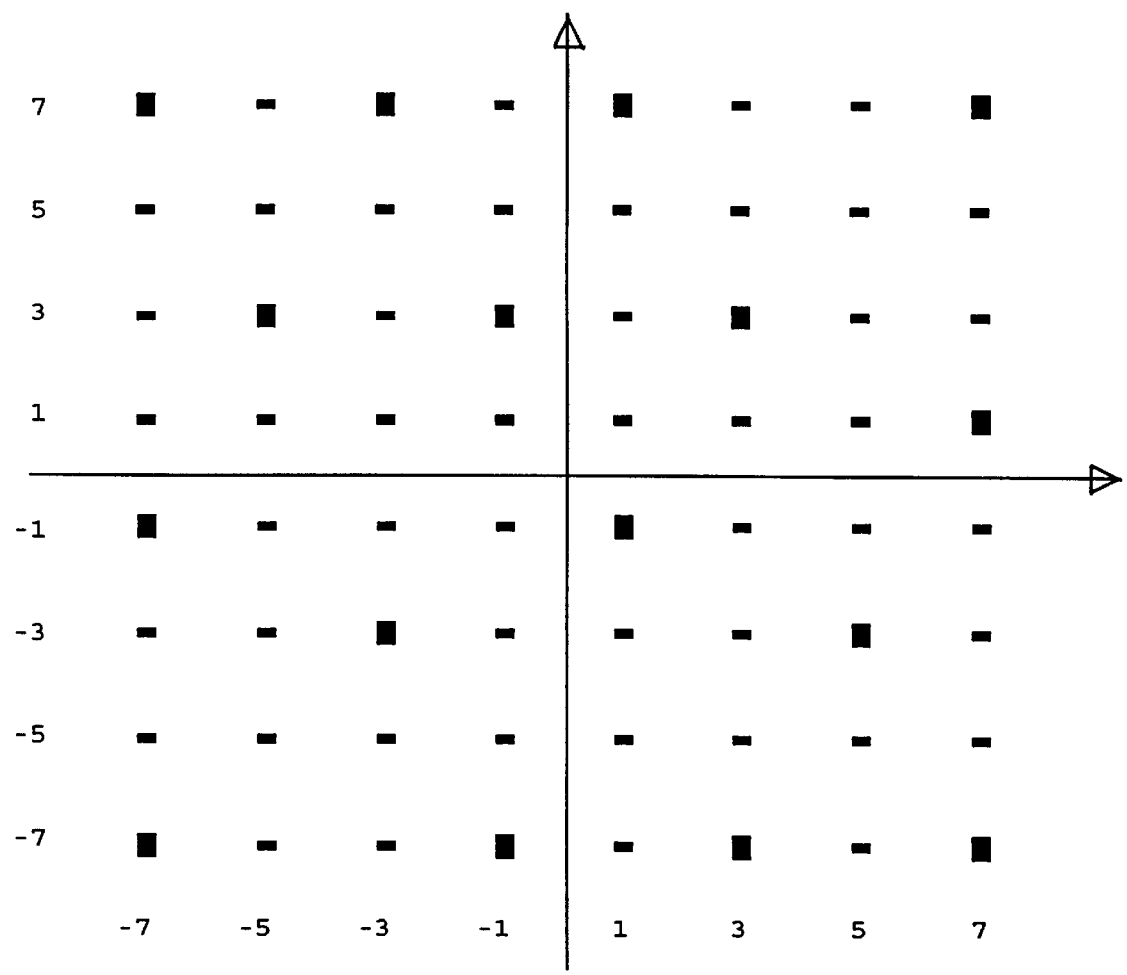
FIG. 8 illustrates a set of points used in a variant of the invention.

It can be seen, in FIG. 8, that certain values of amplitude couples (or component couples) of the QAM-64 signal are not used in this variant. These so-called "forbidden" values (represented by a light point) are arranged in such a way that two used component couples can be neither so-called "immediate" neighbours (that is to say with a first common component and second components which differ by only one unitary value, in this case equal to 2), nor so-called "quite close" neighbours (that is to say the first components of which differ by only one unitary value and the second components of which differ by only one unitary value).

It should be noted that the transmitting and receiving devices according to the present invention are preferentially implemented in the form of electronic circuits operating in real time.

Figure 9:
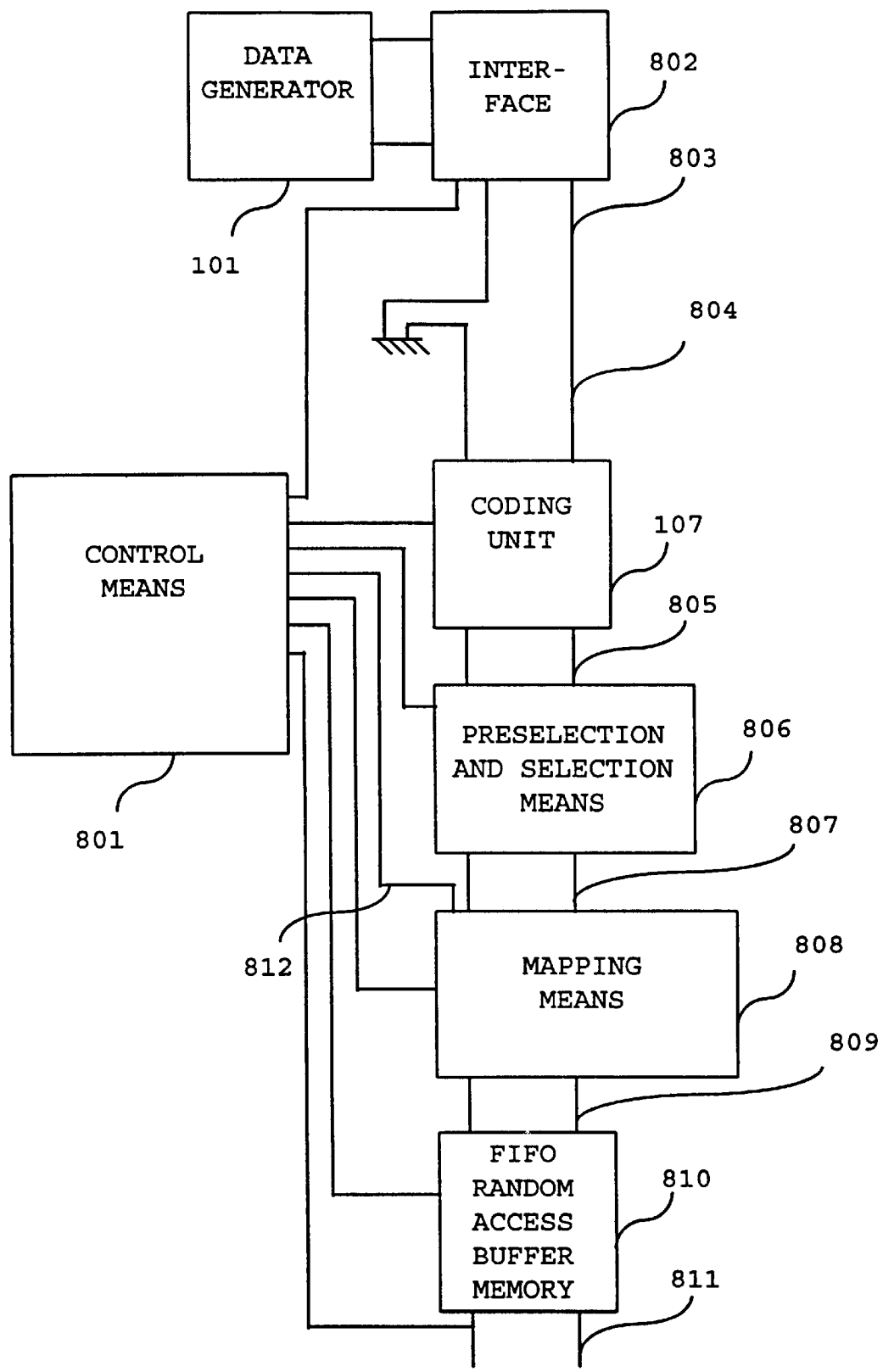
FIG. 9 illustrates an electronic embodiment of the transmission device according to the invention.

FIG. 9 illustrates such an electronic embodiment of the transmission device, in which the following follow one another on the data path:
the data generator 101,
an interfacing component 802,
a bus 803,
a bus 804,
a coding unit 107,
a bus 805,
a preselection and selection means 806,
a bus 807,
a mapping means 808,
a bus 809,
a random access buffer memory 810, of FIFO type, and
a bus 811.

A control means 801 is connected to:
the interfacing component 802,
the coding unit 107,
the preselection and selection means 806,
the mapping means 808,
the random access buffer memory 810, and
the bus 811.

This control means 801 manages the clock signals, the write and read signals and enable signals. It also allows initialisation of the components (in particular programmable components) and controls the degree of fill of the random access buffer memory 810.

The interfacing component 802 implements an interface to the standard known to persons skilled in the art under the name IEEE 1394. It is, in the example shown, a component manufactured by the American company TEXAS INSTRUMENT, and a controller managing this component.

The bus 803 has six lines which each carry, in parallel, one binary data item. The bus 804 has eight lines which, for the first six extend the six lines of the bus 803 and carry respectively the same signals and, for the last two, are connected to the earth of the electronic card shown, this earth corresponding to the binary "0" signal, and a positive voltage, greater than a predetermined value, corresponding to the binary "1" signal. The two lines thus added correspond to the most significant bits used by the coding unit 107.

The coding unit 107 is composed of the component AHA 4011 mentioned above (FIG. 1). The bus 805 has eight data lines carrying, in parallel, eight binary signals.

The preselection and selection means 806, which implements jointly the functions of the preselection means 204 and the selection means 205, is composed of a programmable component manufactured by the American company ALTERA, under the reference EPM7256.

The buses 807 and 809 each have six data lines carrying six binary signals.

The mapping means 808 is a programmable read-only memory, known to persons skilled in the art under the name PROM. In the example shown, it is a memory of CYPRESS make, referenced CY7C225A. The mapping means 808 receives, on an address bus having at least seven lines, the six lines of the data bus 807.

The line 812 goes from the control means 801 to one of the lines of the address bus of the mapping means 808 which is not connected to the data bus 807. The line 812 carries a binary signal which switches the mapping table used between that corresponding to Table 1 and that corresponding to Table 2. This switching is carried out cyclically as explained above.

The random access buffer memory 810, of FIFO type, manages the variations in flow coming from the output of the coding unit 107. It is manufactured under the reference CY7C451 of CYPRESS make.

Figure 10:
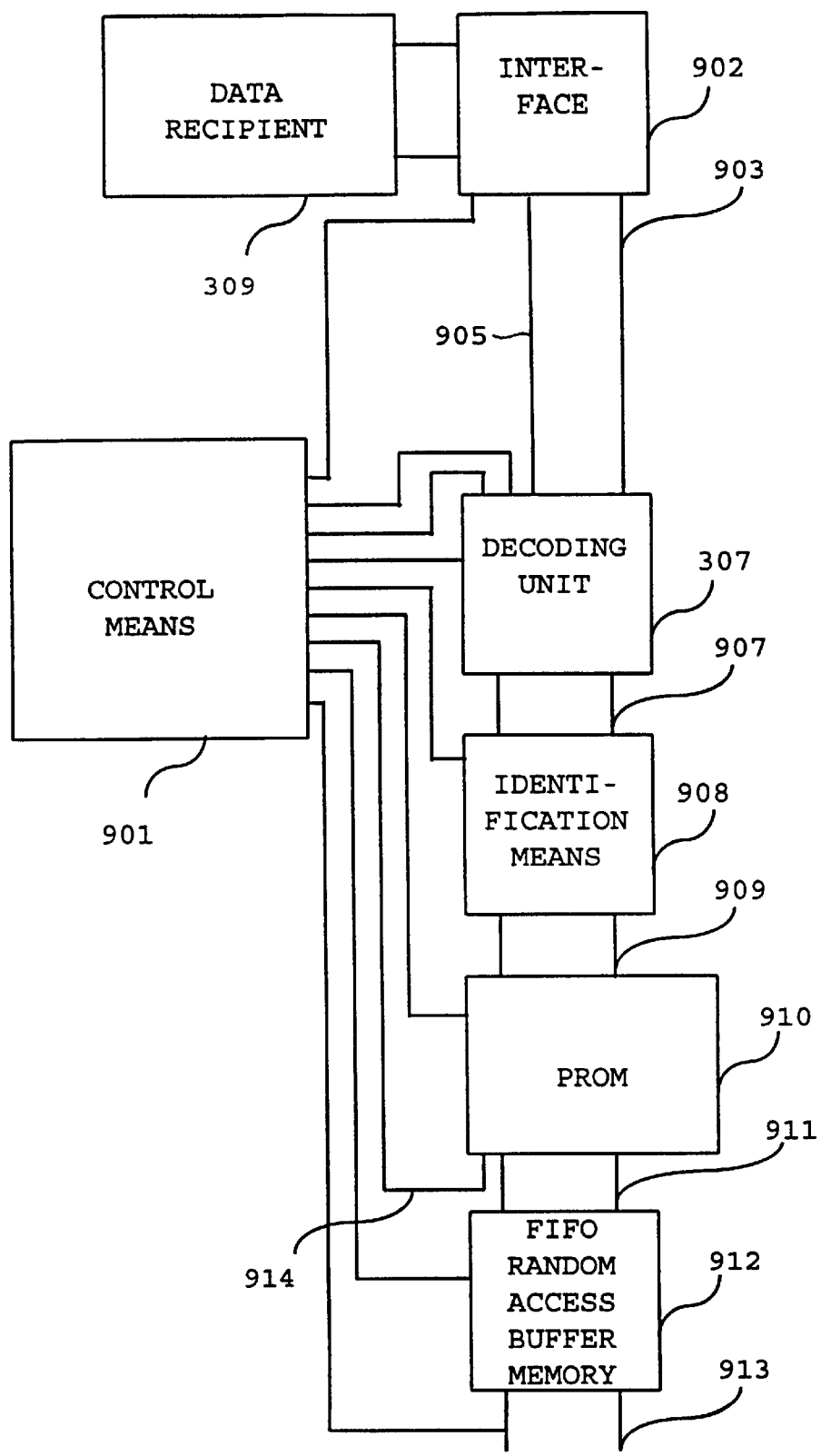
FIG. 10 illustrates an electronic embodiment of the receiving device according to the invention.

FIG. 10 illustrates an electronic embodiment of the receiving device according to the invention, in which the following follow one another:
a bus 913,
a random access buffer memory 912, of FIFO type,
a bus 911,
a programmable read-only memory 910,
a bus 909,
an identification means 908,
a bus 907,
the decoding unit 307,
a bus 905,
a bus 903,
an interfacing component 902 and
the digital data recipient 309.

A control means 901 is connected to:
the interfacing component 902,
the coding unit 307,
the identification means 908,
the programmable read-only memory 910, and
the random access buffer memory 912.

This control means 901 manages the clock signals, the memory write and read signals and enable signals. It also allows initialisation of the components (in particular programmable components) and controls the degree of fill of the random access buffer memory 912. Finally, it uses a program for detecting decoding errors, by continuously verifying that data reaching it from most significant bit output pins of the decoding unit 307 remain at binary zero values.

The interfacing component 902 implements an interface to the standard known to persons skilled in the art under the name IEEE 1394. It is, in the example shown, a component manufactured by the American company TEXAS INSTRUMENT and a controller for managing this component.

The bus 903 has six lines which each carry, in parallel, one binary data item coming from six pins of the decoding unit 307. These six pins correspond to the least significant bit outputs of the decoding unit 307.

The decoding unit 307 is composed of the component AHA 4011 mentioned above (FIGS. 1 and 3). The two most significant bit output pins of the decoding unit 307 are connected to inputs of the control means 901 and allow use of the error detection program. In addition, the decoding unit has its own error detection functions, in a manner known to persons skilled in the art.

The identification means 908 is presented with reference to FIG. 4. It is composed of a programmable component manufactured by the American company ALTERA, under the reference EPM7256.

The buses 909, 911 and 913 each have six data lines carrying six binary signals.

The programmable read-only memory 910, known to persons skilled in the art under the name PROM, constitutes the sorting means 402 (FIG. 4) and the matching means 403. In the example shown, it is a memory of CYPRESS make, referenced CY7C225A. The address bus of the programmable read-only memory 910 has at least seven lines, six of which extend the lines of the bus 911.

The line 914 goes from the control means 901 to one of the lines of the address bus of the programmable read-only memory 910 which is not connected to the bus 911. The line 914 carries a binary signal which switches the mapping table used between that corresponding to Table 1 and that corresponding to Table 2. This switching is carried out cyclically as explained above.

The random access buffer memory 912, of FIFO type, manages the variations in flow coming from the output of the coding unit 107. It is manufactured under the reference CY7C451 of CYPRESS make.

According to a third variant, when the redundant symbols do not supply a number and digital data formats allow an exact number of digital data couples to be produced, the selection means is adapted to add so-called "stuffing" bits, to avoid de-synchronisation of the transmission device.

According to a fourth variant, the rules for mapping between the component couples and the digital data vary not only for the redundant symbols, but also for the symbols to be coded, in a cyclic manner.

According to a fifth variant, the symbols to be transmitted consist of only the redundant symbols, and the mapping means 206 receives:

- from the selection means 205, amplitude couples, as explained above, these amplitude couples corresponding only to redundant symbols, and
- from the digital data generator 101, the sextuples supplied by this generator, sextuples which the transmission means interprets as amplitude couples.

This variant is illustrated by a broken line in FIG. 2, a line which represents the direct transmission from the generator to the mapping means.

More generally than the particular embodiment presented above with reference to the accompanying drawings, and still according to the invention:

the preselection means receives so-called "to be transmitted" symbols of an alphabet having a number Q of symbols and supplies, to the selection means, digital data capable of taking T different values, T being less than Q, the number Q being equal to $2^q$, the number T being equal to $2^t$, q not being a multiple of t;

the transmission medium is of the type
- wire, that is to say it has a solid physical medium between the transmission device and the receiving device, and/or
- electromagnetic, the transmission being performed by modulation of an electromagnetic wave, for example radio, infrared, etc,
- sound, the transmission on the transmission medium being performed by modulation of a sound wave.

What is claimed is:

1. A device for transmitting digital data, representing a physical quantity, comprised of:

a selector that selects certain couples of digital data which follow each other;

a mapper that maps, according to a set of predetermined rules, each selected digital data couple to an amplitude couple; and a transmitter that transmits a signal in quadrature having a first component and a second component, said first and second components being respectively modified by first and second amplitudes of the amplitude couples, said set of predetermined rules including at least a first rule according to which, when an estimated probability that two amplitude couples are confused after the said transmission is greater than a first predetermined value, then the digital data couples corresponding to said two amplitude couples have first or second digital data items having a same value;

wherein a component couple transmitted by the transmitter being received, is possibly affected by errors, by a receiver.

2. The transmission device of claim 1, where the set of predetermined rules also includes a second rule according to which, for a predetermined proportion of pairs of amplitude couples where the estimated probability that the couples are confused after transmission is greater than a second predetermined value but less than the first predetermined value, then the digital data couples corresponding to the two amplitude couples have first or second digital data items having the same value.

3. The transmission device of either of claims 1 or 2, where the transmitter is arranged to transmit a signal which is amplitude modulated in accordance with two carriers in quadrature with 64 states.

4. The transmission device of claim 2, where the transmitter is arranged to transmit a signal which is amplitude modulated in accordance with two carriers in quadrature with 64 states, and where the predetermined proportion is 74 out of 98 pairs of amplitude couples.

5. The transmission device of any of claims 1, 2 or 4 where:

the selector is adapted to use predetermined cyclic selection rules, using a selection cycle number, where two digital data items separated by an integer number of selection cycles are selected in an identical manner by the selector, and the mapper is adapted to use predetermined cyclic mapping rules, using a mapping cycle number, where two equal couples separated by an integer number of mapping cycles are mapped to the same amplitude couple.

6. The transmission device of any of claims 1, 2 or 4 further comprising a preselector, arranged to receive "to be transmitted" symbols of an alphabet having a number Q of symbols and to supply to the selector digital data which can take P different values, where P is less than Q.

7. The transmission device of claim 6, where the number Q is equal to $2^q$, and the number P is equal to $2^p$, and the exponent of q is not a multiple of the exponent p.

8. The transmission device of claim 6, where the preselector is arranged to receive "to be transmitted" symbols, where each such symbol can be represented by a binary data sequence, and further arranged to supply to the selector digital data, where each digital datum represents segments of the binary data sequences.

9. The transmission device of claim 6, further comprising a coder, arranged to receive "to be coded" symbols of the alphabet having a number Q of symbols, and further arranged to supply to the preselector "redundant" symbols of said alphabet having a number Q of symbols, where such redundant symbols are able to permit error correction regarding symbols "to be coded", and where the "to be transmitted" symbols include the said redundant symbols.

10. The transmission device according to claim 9, where the coder uses Reed-Solomon coding.

11. The transmission device of claim 9, further comprising a labeler, arranged to receive "to be transmitted" digital data belonging to an alphabet having P symbols, and to map each "to be transmitted" digital data item to "to be coded" symbols, where Q is strictly greater than P, and where the P symbols of the alphabet having P symbols represent exclusively one and only one symbol of the alphabet having Q symbols.

12. The transmission device according to claim 11, where the labeler is adapted to add predetermined digital data to each symbol of the first alphabet in order to form a secondary digital data item belonging to the second alphabet which corresponds to said symbol of the first alphabet.

13. A device for receiving couples of components of signals in phase quadrature, comprising:
    a receiver that receives the signals and to supply component couples;
    a sorter that selects certain "sorted" component couples; and
    a couple matcher that matches, according to a set of predetermined matching rules, each sorted component couple, with a received digital data couple, the set of predetermined matching rules including at least a first rule according to which, when an estimated probability that two signals having two component couples are confused after reception is greater than a first predetermined value, then the received digital data couples corresponding to the said two component couples have first or second digital data items having a same value;
    wherein a component couple transmitted by a transmitter being received, is possibly affected by errors, by the receiver.

14. The receiving device of claim 13, where the set of predetermined matching rules also includes a second rule according to which, for a predetermined proportion of pairs of couples of components where the estimated probability that the couples are confused after transmission is greater than a second predetermined value and less than the first predetermined value, then the received digital data couples corresponding to said two component couples have first or second digital data items of the same value.

15. The receiving device of claims 13 or 14, where the receiver is arranged to receive a signal which is amplitude modulated in accordance with two carriers in quadrature with 64 states and to supply the component couple of said signal to the sorter.

16. The receiving device of claims 13 or 14, where the receiver is adapted to receive a signal which is amplitude modulated in accordance with two carriers in quadrature with 64 states, the predetermined proportion being 74 of 98 pairs of component couples considered.

17. The receiving device of claim 16, further comprising:
    a sorter arranged to use predetermined cyclic sorting rules, where said sorting rules use a sorting cycle number, and where two digital data items separated by an integer number of sorting cycles are sorted in an identical manner by the sorter; and
    a couple matcher, arranged to use cyclic matching rules, where said matching rules use a so-called matching cycle number, and where two equal couples separated by an integer number of matching cycles are mapped to the same component couple.

18. The receiving device of claim 16, further comprising a data identifier, arranged to receive digital data belonging to an alphabet having P symbols, and to map said received digital data to "to be decoded" symbols belonging to an alphabet having Q symbols, where Q is greater than P.

19. The receiving device of claim 18, further comprised of a decoder, arranged to receive the "to be decoded" symbols of the alphabet having Q symbols, and further arranged to supply "corrected" symbols of said alphabet of Q symbols, using correction rules and redundant symbols to be decoded.

20. The device of claim 19, where the decoder uses Reed-Solomon decoding.

21. The receiver of claim 20, where the number Q is equal to $2^q$, the number P is equal to $2^p$, and the exponent q is not a multiple of the exponent p.

22. The receiver of claim 18, further comprising a translator, arranged to receive the corrected symbols and to supply "transmitted" digital data belonging to the alphabet having P symbols.

23. The receiver of claim 22, where the translator is adapted to receive corrected symbols, each capable of being represented by a binary data sequence, and further adapted to supply transmitted digital data items, each representing segments of said binary data sequences.

24. The receiver of claim 23, further comprised of an error detector, arranged to receive the binary data items of each sequence of binary data, not forming a part of the segments of said sequences, and further arranged to verify that the binary data which it receives are predetermined digital data items.

25. The receiver of claim 23, where the translator is adapted to remove predetermined digital data from each corrected symbol in order to form a transmitted digital data item.

26. A method of transmitting digital data representing a physical quantity, comprising the steps of:
    selecting certain digital data couples which follow each other;
    mapping, in accordance with a set of predetermined rules, each selected digital data couple to an amplitude couple; and
    transmitting a signal in quadrature having a first component and a second component, the first and second components being respectively modified by the first and second amplitudes of said amplitude couples, the set of predetermined rules including at least a first rule according to which, when an estimated probability that two amplitude couples are confused after the transmission is greater than a first predetermined value, then the digital data couples corresponding to the said two amplitude couples have first or second digital data items having a same value.

27. The transmission method of claim 26, where the set of predetermined rules also includes a second rule according to which, for a predetermined proportion of pairs of amplitude couples where the estimated probability that the couples are confused after transmission is greater than a second predetermined value but less than the first predetermined value, then the digital data couples corresponding to the said two amplitude couples have first or second digital data items having the same value.

28. The transmission method of either of claims 26 or 27, where, in the transmission step, a signal which is amplitude modulated is transmitted in accordance with two carriers in quadrature with 64 states.

29. The transmission method of claim 27, further comprising transmitting a signal which is amplitude modulated in accordance with two carriers in quadrature with 64 states, where the predetermined proportion corresponds to 74 out of 98 pairs of amplitude couples considered.

30. The transmission method of any of claims 26, 27 or 29, where, in the selection step, predetermined cyclic selection rules are used, using a selection cycle number, two digital data items separated by an integer number of selection cycles are selected in an identical manner during the selection step, and where in the mapping step, predetermined cyclic mapping rules are used, which use a mapping cycle number, where two equal couples separated by an integer number of mapping cycles are mapped to the same amplitude couple.

31. The transmission method of any of claims 26, 27 or 29, further comprising performing a preselection step which includes receiving the "to be transmitted" symbols of an alphabet having a number Q of symbols and supplying digital data items which can take P different values, where P is less than Q, and said digital data items are then processed in the selection step.

32. The transmission method of claim 31, where Q is equal to $2^q$, the number P is equal to $2^p$, and the exponent q is not a multiple of the exponent p.

33. The transmission method of claim 31, where, the preselection step includes receiving symbols "to be transmitted" which are each capable of being represented by a sequence of binary data items, and supplying digital data items, each representing segments of said sequences, said segments then being processed at the time of the selecting.

34. The transmission method of claim 31, further comprising a coding step of receiving "to be coded" symbols of the alphabet having a number Q of symbols, and supplying "redundant" symbols of said alphabet, having a number Q of symbols, said "redundant" symbols being capable of correcting errors affecting symbols to be coded, where the symbols to be transmitted, which are processed during the preselection step include said redundant symbols.

35. The method of claim 34, where, during the coding step, Reed-Solomon coding is used.

36. The transmission method of claim 34, further comprising a labeling step of receiving "to be transmitted" digital data items, belonging to an alphabet having P symbols, and mapping each said digital data item to "to be coded" symbols, where Q is greater than P, and where said P symbols of the alphabet having P symbols each represent exclusively one and only one symbol of the alphabet having Q symbols.

37. The method of claim 36, where the labeling step further comprises adding predetermined digital data items to each symbol of the alphabet having Q symbols in order to form a secondary digital data item belonging to the alphabet having P symbols which corresponds to said symbol of the alphabet having Q symbols.

38. A method for receiving couples of components of signals in phase quadrature, comprising:
   receiving signals and supplying the component couples;
   performing sorting, which includes selecting certain "sorted" component couples,
   matching, in accordance with a set of predetermined matching rules, each sorted component couple with a received digital data couple, where said set of predetermined matching rules include at least a first rule according to which, when an estimated probability that two signals having two component couples are confused after the reception is greater than a first predetermined value, then the received digital data couples corresponding to the said two component couples have first or second digital data items having a same value.

39. The receiving method of claim 38, where the set of predetermined "matching" rules also includes a second rule according to which, for a predetermined proportion of pairs of component couples where the estimated probability that the couples are confused after transmission is greater than a second predetermined value but less than the first predetermined value, then the received digital data couples corresponding to the said two component couples have first or second digital data items of the same value.

40. The receiving method according to either of claims 38 or 39, where it includes receiving a signal which is amplitude modulated in accordance with two carriers in quadrature with 64 states and supplying the component couple of said signal, the said couple then being processed in the sorting step.

41. The receiving method of claim 39, where, during the receiving step, receipt of a signal is effected which is amplitude modulated in accordance with two carriers in quadrature with 64 states, the predetermined proportion corresponding to 74 out of 98 pairs of component couples considered.

42. The receiving method according to any of claims 38, 39 or 41, further comprising:
   using, in the sorting step, predetermined cyclic sorting rules, which use a sorting cycle number, such that two digital data items separated by an integer number of sorting cycles are sorted in an identical manner during the sorting step, and
   using, in the matching step, cyclic matching rules, which use a matching cycle number, such that two equal couples separated by an integer number of matching cycles are matched with the same component couple.

43. The receiving method according to any of claims 38, 39 or 41, further comprising an identification step of receiving digital data, belonging to an alphabet having P symbols, and mapping the received digital data items to "to be decoded" symbols, which belong to an alphabet having Q symbols, where Q is greater than P.

44. The receiving method of claim 43, further comprising a decoding step of receiving "to be decoded" symbols of the alphabet having a number Q of symbols, and supplying "corrected" symbols of said alphabet of Q symbols, using correction rules and "redundant" symbols to be decoded.

45. The method of claim 44, where, during the decoding step Reed-Solomon decoding is used.

46. The receiving method of claim 43, where the number Q is equal to $2^q$ the number P is equal to $2^p$, and the exponent q is not a multiple of the exponent p.

47. The receiving method according to any of claims 38, 39, or 41, further comprising a translating step of receiving the corrected symbols and supplying "transmitted" digital data items, belonging to an alphabet having P symbols.

48. The receiving method according to claim 47, characterized by, during the translation step, receiving corrected symbols, each capable of being represented by a sequence of binary data items, and supplying transmitted digital data items, each representing segments of sequences.

49. The receiving method of claim 48, further comprising an error detection step of:
   receiving binary data items of each sequence of binary data items, not forming part of the segments of said sequences, and verifying the received binary data items to be predetermined digital data items.

50. The receiving method according to claim 48, characterized by, in the translation step, removing predetermined digital data from each corrected symbol to form a transmitted digital data item.

* * * * *

UNITED STATES PATENT AND TRADEMARK OFFICE
CERTIFICATE OF CORRECTION

PATENT NO. : 6,301,307 B1
DATED : October 9, 2001
INVENTOR(S) : Claude Le Dantec et al.

It is certified that error appears in the above-identified patent and that said Letters Patent is hereby corrected as shown below:

Column 1,
Line 57, "6-uples;" should read -- sextuples; --; and "6-uples;" should read
-- sextuples --; and
Line 61, "6-uple." should read -- sextuple. --

Column 2,
Line 2, "QAM-64symbol" should read -- QAM-64 symbol --.

Column 4,
Line 53, "invention," should read -- invention; --

Column 6,
Line 4, "so-called" should read -- so-called "redundant" symbols to be decoded. --.

Column 12,
Line 33, "item" should read -- item, --.

Column 13,
Line 12,"composed" should read -- composed: --.

Column 15,
Line 3, "robabil-" should read -- probabil --.

Column 18,
Line 8, "datal" should read -- data --.

Column 22,
Line 13, "value" should read -- value, --; and
Line 40, "selector, and" should read -- selector; and --.

Column 23,
Line 31, "value;" should read -- value, --.

Column 24,
Lines 8, 10, 13, 17, 22 and 27, "receiver" should read -- receiving device --.

UNITED STATES PATENT AND TRADEMARK OFFICE
CERTIFICATE OF CORRECTION

PATENT NO. : 6,301,307 B1
DATED : October 9, 2001
INVENTOR(S) : Claude Le Dantec et al.

It is certified that error appears in the above-identified patent and that said Letters Patent is hereby corrected as shown below:

Column 25,
Line 34, "method" should read -- transmission method --; and
Line 44, "method" should read -- transmission method --; and
Line 55, "couples" should read -- couples; and --.

Column 26,
Line 25, "step, and" should read -- step; and --; and
Line 41, "method" should read -- receiving method --; and
Line 44, "$2^q$" should read -- $2^q$, --.

Signed and Sealed this

Sixteenth Day of September, 2003

JAMES E. ROGAN
*Director of the United States Patent and Trademark Office*